United States Patent [19]

Richards

[11] 4,127,059
[45] Nov. 28, 1978

[54] METHOD OF FORMING A CONTAINER

[75] Inventor: Frank P. Richards, Prairie Village, Kans.

[73] Assignee: Phillips Petroleum Company, Bartlesville, Okla.

[21] Appl. No.: 804,133

[22] Filed: Jun. 6, 1977

[51] Int. Cl.² ............................................... B31C 1/06
[52] U.S. Cl. .................... 93/36.5 R; 93/39 C; 93/55.1 R
[58] Field of Search ............ 93/36.5 R, 39 C, 39.1 R, 93/55.1 R, 39.2, 39.3

[56] References Cited
U.S. PATENT DOCUMENTS

| 1,855,622 | 4/1932 | Brooks | 93/39.1 R X |
| 2,602,383 | 7/1952 | Barbieri | 93/39.1 R |
| 3,342,113 | 9/1967 | Baumgartner | 93/36.5 R X |
| 3,469,507 | 9/1969 | West | 93/39.1 R |
| 3,855,908 | 12/1974 | Schmidt et al. | 93/39 C X |
| 4,041,848 | 8/1977 | Richards | 93/36.5 R |

Primary Examiner—James F. Coan

[57] ABSTRACT

A method is provided for forming a container having a tubular sidewall and a bottom closure member secured to the sidewall. The method includes forming a bottom member having a bottom panel and a depending skirt with the free end of the skirt having a diameter sized relative to the sidewall such that during wrapping of a sidewall forming blank about a mandrel the skirt presents minimal or no resistance to the wrapping of the sidewall blank about the mandrel. After the sidewall blank is wrapped about the mandrel, the bottom member is reformed, whereby the skirt substantially conforms to the shape of the container sidewall, and simultaneously the sidewall and bottom closure member are secured together.

5 Claims, 4 Drawing Figures

METHOD OF FORMING A CONTAINER

In the manufacture of containers such as those made from paper or fiberboard, one method involves the formation of a bottom closure member which is comprised of a central bottom panel and a peripheral depending skirt. After the formation of the bottom closure member, it is placed on a free end of a mandrel and is releasably retained thereon after which a sidewall blank is wrapped about the mandrel after which overlapping marginal portions of the sidewall blank are secured together and the skirt of the bottom closure member is also secured to the wrapped sidewall blank. One of the problems attendant with making a container by such a method is that during formation of the bottom closure member from a blank, the skirt flares outwardly whereby the skirt takes the form of a truncated cone which diverges away from the bottom panel. After being placed on the free end of the mandrel the skirt extends radially beyond the diameter of the mandrel thereby presenting interference or resistance to wrapping of the sidewall blank about the mandrel. The interference can result in shifting of the bottom closure member on the mandrel or can cause release of the bottom closure member from the mandrel. This results in a poorly formed bottom or distorted sidewall in a container with the resulting production of scrap or low quality containers.

An alternate process used in the art is to place the formed bottom closure member in a pocket in the end of a mandrel and then, after wrapping of the sidewall blank about the mandrel, the bottom closure member is moved out of the pocket for engagement of the skirt with an interior surface of the wrapped sidewall blank. This is an effective way in overcoming the problem described above. However, such a process requires additional mechanisms in the apparatus used in forming the container. The present invention provides another alternative solution to overcome the problem and achieve high quality containers by overcoming the above-described problem of interference between the skirt and sidewall blank during wrapping of the sidewall blank. This will result in the bottom closure member being maintained in the proper location on the mandrel and prevent the accidental release of the bottom closure member from the end of the mandrel.

The principal objects and advantages of the present invention are: to provide a process for forming a container which overcomes the above-described problems of interference between a flared skirt and a sidewall blank during wrapping of the sidewall blank; to provide such a process which requires no additional mechanism in the container-forming apparatus; and to provide such a process which is well adapted for its intended use.

Other objects and advantages of the present invention will become apparent from the following detailed description taken in connection with the accompanying drawings wherein are set forth by way of illustration and example certain embodiments of this invention.

Figure 1:
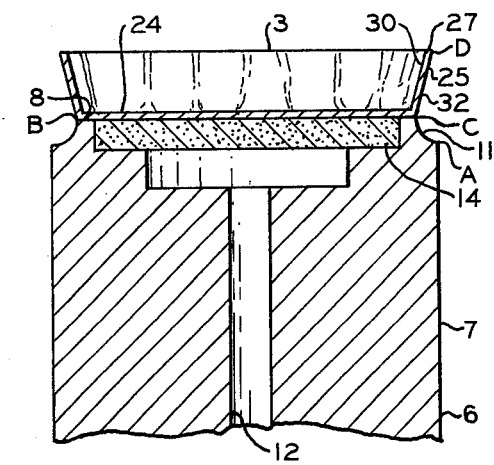
FIG. 1 is a fragmentary sectional view of a mandrel having a bottom closure member retained on a free end thereof.
Figure 2:
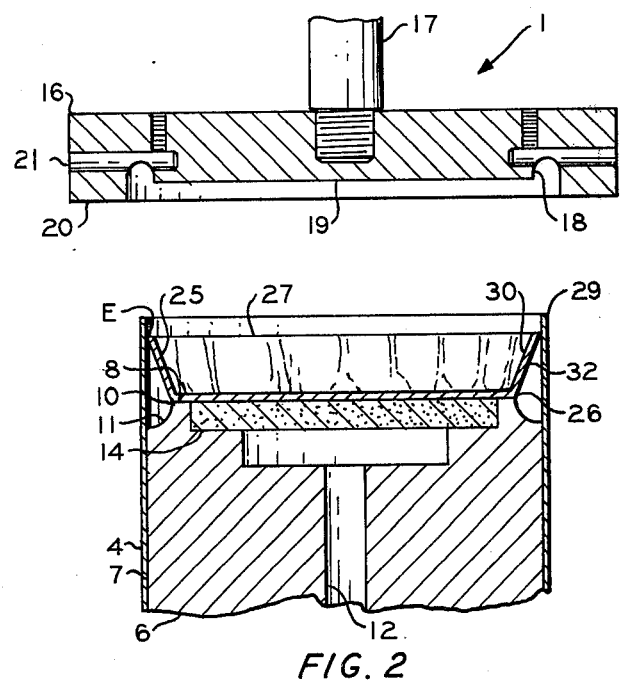
FIG. 2 is a fragmentary sectional view of a mandrel having a bottom closure member on the free end of the mandrel with a sidewall blank wrapped therearound and also showing means for reverse bending a marginal portion of the sidewall blank.
Figure 3:
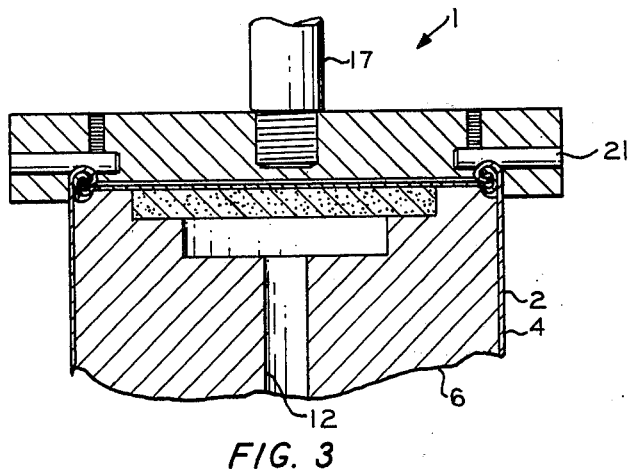
FIG. 3 is a view similar to FIG. 2 but showing the reverse bending means in a forming position.

Referring more in detail to the drawings, the reference numeral 1 designates generally an apparatus operable for partially forming a container 2 which is comprised of a bottom closure member 3 and a sidewall 4. The apparatus 1 includes a mandrel 6 which has a side wrapping surface 7 extending from a turret (not shown), on which the mandrel 6 is mounted toward a free end 8 and terminating adjacent the free end 8. At the point of termination the mandrel 6 has a diameter A. The surface 7 can be of any suitable shape such as generally cylindrical or frustoconical wherein same converges toward the free end 8 for making generally cylindrical or frustoconical containers respectively. In the illustrated structure the mandrel 6 has a reduced diametral portion 10 on the free end 8 forming a groove or recess 11 on the mandrel 6. This reduced size portion has a diameter on the free end thereof of B which is less than the diameter A. The mandrel 6 can also be provided with means for ejecting a formed container therefrom as, for example, by air ejection, wherein a flow passage 12 opens onto the end 8 and can have a sintered metal insert 14 to form a porous surface which allows compressed air from the passage 12 to eject a formed container while still providing a substantially continuous surface against which a bottom member 3 can be releasably retained. A mechanical ejector can also be used as a vacuum passage wherein a bottom member 3 can be held against the insert 14 by the application of reduced pressure in the passage 12, relative to atmospheric pressure, and thereby releasably retain the bottom member 3 in position on the end 8.

A forming head 16 is also provided and any suitable type can be used. In the illustrated embodiment, the forming head 16 is mounted on a shaft 17 which is connected to motive means (not shown) as is known in the art to provide both rotational and axial reciprocal movement of the forming head 16. The forming head 16 has a groove 18 which is annular in shape and is adapted for reverse bending a marginal portion of the end of a sidewall 4 over onto an interior surface of the bottom member 3. Preferably, a planar surface 19 is encompassed by the groove 18 and is recessed in a bottom surface 20 of the forming head 16 as is the groove 18. This provides clearance between the forming head 16 and portions of the bottom member 3. The forming head 16 can also be provided with wear resistant forming pins 21 as is known in the art. It is to be noted that the mandrel 6 can be rotated and the forming head 16 held stationary or any other combination so long as there is relative rotation.

In the formaton of the container 2, using the apparatus 1, the bottom member 3 is formed such as by passing a bottom blank through a forming die as is known in the art to form a circular central bottom panel 24 and a peripheral depending skirt 25 with a fold line 26 therebetween. The fold line 26 defines the peripheral edge of the bottom panel 24 and is of a diameter C which is approximately equal to the diameter B. However, diameter C can be larger or smaller than the diameter B and smaller than diameter A. After passing through the die, the bottom member 3 is placed on the end 8 of the mandrel 6, preferably in a coaxial position, and is held thereon in a releasable manner such as by the application of vacuum as described above. When unrestrained by the forming die, the skirt 25 expands radially to assume a generally truncated conical shape diverging outwardly from the panel 24 to a free end 27. The free end 27 has an outer diameter D larger than the diameter C with the diameters C and D sized relative to one another so that the flare in the skirt is such that the diameter D is sized relative to diameter A so as to present non-detrimental or no interference during the wrapping of a sidewall blank about the mandrel 6. By proper selection of a forming die to form the diameter C and given a particular type of material from which to form the bottom 3, the diameter D can be properly selected to preferably be approximately equal to or less than an inside diameter E of the sidewall 4. The diameter D can be smaller than or slightly larger than a diameter E of the inside of the sidewall 4. The amount of the diameter D being larger than the diameter E can be such that little resistance or non-detrimental interference is presented to the wrapping of the sidewall blank about the mandrel 6. As for example, depending on the flexibility of the skirt which depends on the material from which the bottom member is formed, the diameter D would be no more than about 1/16 inch larger than the diameter E. The diameter E of the inside of the sidewall 4 is approximately equal to and preferably substantially equal to the diameter A of the mandrel 6 in the case of a cylindrical mandrel 6, and in the case of a tapered mandrel 6 the diameter E of the free end of the sidewall would be less than the diameter A. The diameter E as above-described for a tapered sidewall is that diameter of the sidewall 4 immediately adjacent the free end 27 of the bottom member 3. An end portion 29 of the sidewall 4 extends beyond the free end 27 of the bottom member so that same can be reverse bent by the action of the forming head 16 as more fully described below. However, the end portion 29 is not necessary.

Figure 4:
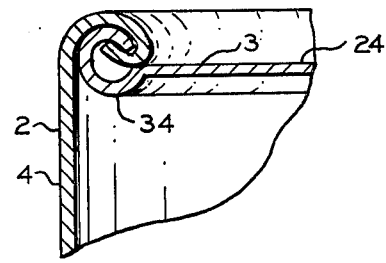
FIG. 4 is an enlarged fragmentary sectional view of the joint between the bottom closure member and the sidewall of a container.

After the bottom member 3 is placed on the end 8, a sidewall blank is wrapped about the mandrel 6 so that side marginal portions thereof overlap which are then secured together such as by adhesion as is known in the art. The mandrel 6 and forming head 16 move axially relative to one another and it is preferred that the forming head 16 do the moving. After the side marginal portions are secured together, the forming head 16 is actuated to rotate and move axially into engagement with the sidewall 4 wherein axial movement and rotational movement of the forming head 16 reverse bends the end 29 so that an interior surface of the sidewall 4 is moved into engagement with an interior surface 30 of the skirt 25. The rotation of the forming head smooths out the bend in the sidewall 4. Further axial movement and rotational movement of the forming head 16 causes radial expansion of the skirt such that the outer peripheral portion of the exterior surface 32 substantially conforms in size and shape to the interior surface of the sidewall 4 immediately adjacent thereto. The groove 11 is provided, if desired, for expansion space into which a portion of the skirt 25 can be deformed by action of the forming head 16 and thereby form an annular protuberance on the bottom member which projects generally in a direction opposite to that of the skirt 25 extending from the bottom panel 24. The protuberance 34, however, is not particularly necessary but is desirable for forming a smooth joint, and is positioned radially outwardly from the fold line 26 and substantially conforms to the size and shape of the groove 11. Completion of the axial and rotational movement of the forming head 16 forms a bead substantially as shown in FIG. 4 wherein after being reverse bent, a lower portion of the skirt adjacent the end 27 is also slightly bent radially inwardly and toward the bottom panel 24. This provides a well rounded bottom edge for the container 2.

Upon the completion of the reverse bending operation of the forming head 16, the formation of the bottom closure is complete and the forming head 16 is retracted. The mandrel 6 is then moved out of alignment with the forming head 16, after which the container 2 can be ejected from the mandrel 6. Securing of the bottom member 3 to the sidewall 4 can be accomplished during the reverse bending operation or in subsequent steps as is known in the art. The bottom member 3 is normally secured to the sidewall 4 by adhesion as is known in the art. Also, in place of the one-step reverse bending operation, a two-step forming operation can be provided wherein the skirt 25 can be expanded before the reverse bending operation thereby forming the annular protuberance at this time after which the reverse bending operation can be accomplished as described above. This can be accomplished by the use of two different forming heads. After the container has been completed as described above and ejected from the mandrel, the container can be transferred to other processing equipment for further forming operations such as the formation of bead on the top open end of the container 2. These steps are known in the art and need not be further described herein.

It is to be understood that while there has been illustrated and described certain forms of the present invention, it is not to be limited to the specific form or arrangement of parts or steps herein described and shown except to the extent that such limitations are found in the claims.

What is claimed and desired to be secured by Letters Patent is:

1. A method of forming a container having a sidewall and a bottom closure member secured together, said method including the steps of:
   providing a bottom member having a generally circular bottom panel and a skirt connected to and depending from said bottom panel with a fold line therebetween with an outer first diameter, said skirt being generally in the form of a truncated cone diverging away from said bottom panel and terminating in a free end having an outer second diameter larger than the first diameter;
   placing said bottom member on a free end of a mandrel generally coaxially with the mandrel with said bottom panel engaging said mandrel free end and said skirt extending generally away from said mandrel free end, said mandrel having a side surface adapted for having wrapped thereon a sidewall blank, said side surface terminating adjacent the mandrel free end and having a third diameter at the side surface point of termination larger than said first diameter;
   retaining, in a selectively releasable manner, said bottom member on said mandrel free end;
   wrapping a sidewall blank on said side surface and thereby overlapping portions of the sidewall blank, said second diameter being sized relative to an inside fourth diameter of the wrapped sidewall blank immediately adjacent a free end of the skirt such as to substantially prevent interference of the skirt with the wrapping of the sidewall blank about said mandrel;

securing the overlapping portions together thereby forming a tubular sidewall;

radially expanding a portion of the skirt whereby a portion of the skirt is reformed to generally conform to the shape of an interior surface portion of the sidewall adjacent the portion of the skirt; and securing said skirt to said sidewall.

2. A method as set forth in claim 1 including:

reverse bending an end portion of the sidewall so that an interior surface portion of the sidewall overlies an interior surface portion of the skirt; and securing the thus reverse bent portion of the sidewall to said skirt, said sidewall having a first end adjacent said end portion and said skirt and a second end remote from said skirt.

3. A method as set forth in claim 2 wherein:
said sidewall is generally cylindrically shaped.

4. A method as set forth in claim 3 wherein:
said skirt is radially expanded wherein the outside diameter of the skirt is substantially equal to the third diameter and the third diameter is substantially equal to the fourth diameter of the sidewall.

5. A method as set forth in claim 3 including:
forming an annular protuberance on said bottom member adjacent to and radially outwardly of said fold line during expanding of the skirt, said protuberance extending from the bottom member in a direction generally toward said second end.

* * * * *